Oct. 9, 1951  E. W. KAISER  2,570,246
EXPANSION MEANS FOR JACKET OR CONDUIT SYSTEM
Filed Nov. 22, 1943

INVENTOR.
Edward W. Kaiser
BY Walter F. Boye

UNITED STATES PATENT OFFICE 2,570,246

EXPANSION MEANS FOR JACKET OR CONDUIT SYSTEMS

Edward W. Kaiser, Chicago, Ill.

Application November 22, 1943, Serial No. 511,366

6 Claims. (Cl. 138—25)

This invention relates, generally, to expansion devices and it has particular relation to expansion devices for jacket or conduit systems such as disclosed in my copending application Serial No. 47,851, filed September 4, 1948.

An object of the invention is to provide the conduits of the system with simple and effectual means whereby expansion and contraction variations or differentials occurring in the same will be automatically and positively compensated for, thus eliminating hazards incidental thereto.

Figure 2:
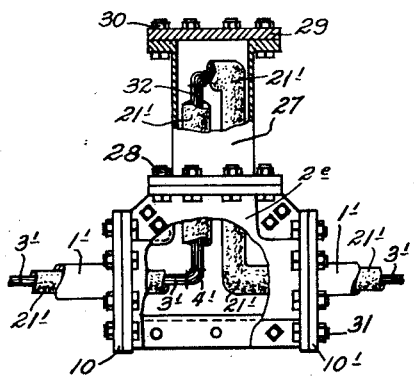
Figure 2 is a similar view of a slightly modified form of expansion U bend.

It will be understood that with usage of the invention, the pipes thereof, in particular, will be subjected to different temperatures and, dependent upon such temperatures, will have longitudinal movement imparted thereto by expansion or contraction. To compensate for such expansion or contraction movement of the pipes, I provide compensating means in the form of looped or substantially U-shaped expansion or contraction formations, such as shown in Figures 1 and 2 of the drawing.

Figure 1:
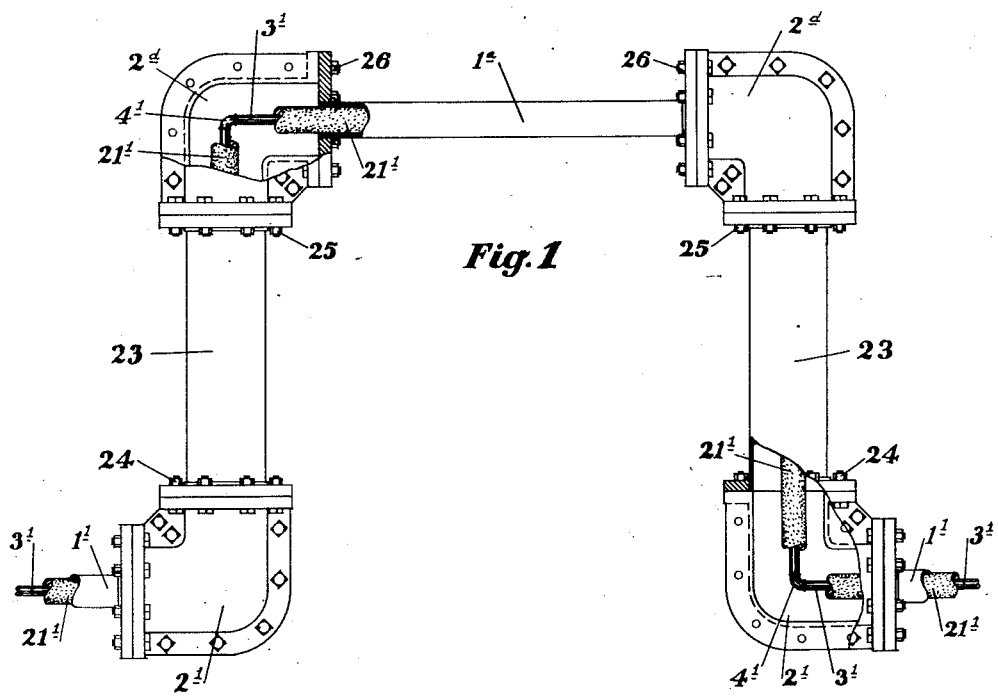
Figure 1 is a fragmentary elevation, with parts broken away and shown in section, of one form of expansion U bend used by the improved system, whereby to compensate for expansion and contraction variations in the conduits comprehended by the system.

In the type of compensator illustrated by Figure 1 of the drawing, the flanged ends of the conduit casings $1^1$ are bolted or otherwise connected to the adjacent ends of right angularly formed longitudinally divided joint fittings $2^1$, the diameters of which are materially greater than those of said casings $1^1$. Comparatively short lengths of conduit casings 23 are connected to the inner and right angularly disposed ends of each of the joint fittings $2^1$ and are bolted or otherwise connected thereto, as indicated at 24. The outer and free ends of the conduit casing lengths 23 have other right angularly formed longitudinally divided joint fittings $2^d$ connected thereto, as indicated at 25, the inside diameters of which, as will be noted, correspond to those of the joint fittings $2^1$ and the conduit casings 23. A length of conduit casing $1^a$ is interposed between and connected to the opposed or remaining open right angularly disposed ends of the divided joint fittings $2^d$, as indicated at 26, it being noted that the diameter of the casing length $1^a$ is less than that of the casing lengths 23 and the joint fittings $2^1$ and $2^d$, preferably, corresponding to that of the previously described conduit casings $1^1$.

Pipes $3^1$ which, if desired, may be provided with heat insulating coverings $21^1$, are received through the conduit casings $1^1$, the fittings $2^1$ and $2^d$ and the conduit casing lengths 23 and $1^a$, constituting the aforesaid expansion and contraction means. Because of the inside diameters of the joint fittings $2^1$, $2^d$ and the conduit casing lengths 23, it will be noted that material relative movement of the pipes within said conduits will be permitted. Consequently, inasmuch as those portions of the pipes $3^1$ within the expansion or contraction compensating means are substantially centered therein, longitudinal movement of said pipes, either by reason of expansion or contraction, will be allowed therewithin, without liability of breaking or fracturing.

In Figure 2 of the drawing, I have shown a somewhat modified form of expansion and/or contraction compensating means. In this particular embodiment, a substantially T-shaped conduit casing or housing is constituted by means of a medially and longitudinally divided T joint fitting $2^e$, the outlet branch of which has an end flanged tubular section 27 bolted or otherwise connected thereto, as at 28. An annular cover or closure plate 29 is engaged over the open end of the section 27 and is connected thereto through bolts 30 or other suitable fastening devices engaging through the same. Conduit casings $1^1$ having flanged inner end portions $10^1$ are connected to the adjacent flanged ends of the opposed horizontal extremities of the T fitting $2^e$, as at 31, while pipes $3^1$ are passed through said conduit casings into the T fitting $2^e$ and are therein formed or provided with a substantially inverted U-shaped loop or bend 32, extending horizontally through the outlet branch of the fitting $2^e$ into the tubular section 27. It will be thus seen that when longitudinal motion is imparted to the body portions of the pipes $3^1$, either by expansion or contraction thereof, such movement will be compensated for by reason of the inherent flexibility of the U-shaped loop portion 32, and in consequence, breaking or fracturing of said conduits, when so subjected to longitudinal movement, will be prevented.

It will be understood and appreciated by workers skilled in this art, that because of the sectional construction or formation of the joint fittings $2^1$, $2^d$ and $2^e$, access may be readily and conveniently had to their respective interiors, merely by removing the connecting bolts of one of the sections of said fittings and thereupon, removing that section without disturbing the permanency, rigidity or other efficiency of the remaining jointure construction.

I claim:

1. In combination, conduits and casings receiving the same therein and therethrough, certain of said casings being angularly disposed with relation to others thereof and spaced with relation to each other, and another of said casings being connected at its opposite ends to and communicating with the outer ends of said angularly disposed casings and disposed substantially parallel to said other casings, the internal cross-sectional areas of the angularly disposed casings being materially greater than the external cross-sectional areas of the conduits received thereby.

2. In combination, conduits and casings receiving the same therein and therethrough, certain of said casings being angularly disposed with relation to others thereof and spaced with relation to each other, another of said casings being positioned between the outer ends of the angularly disposed casings and disposed substantially parallel to said other casings and connected at its opposite ends to and communicating with the outer ends of said angularly disposed casings, the internal cross-sectional areas of the angularly disposed casings being materially greater than the external cross-sectional areas of the conduits received thereby, and the internal cross-sectional area of said another casing being less than that of the angularly disposed casings.

3. In combination, conduits and casings receiving the same therein and therethrough, certain of said casings being angularly disposed with relation to others thereof and spaced with relation to each other, another of said casings being positioned between the outer ends of the angularly disposed casings and disposed substantially parallel to said other casings, sectional joint fittings interconnecting the relatively adjacent ends of said angularly disposed, other and another casings, the internal cross-sectional areas of said angularly disposed casings being materially greater than the external cross-sectional areas of the conduits received thereby, and said last-mentioned conduits being received in and through said angularly disposed casings and joint fittings in spaced relation to their respective inner sides.

4. In combination, conduits and casings receiving the same therein and therethrough, certain of said casings being spaced with relation to each other and angularly disposed with relation to others thereof, another of said casings being positioned between the outer ends of the angularly disposed casings and disposed substantially parallel to said other casings, sectional joint fittings interconnecting the relatively adjacent ends of said angularly disposed, other and another casings, the internal cross-sectional areas of said angularly disposed casings being materially greater than the external cross-sectional areas of the conduits received thereby, said last mentioned conduits being received in and through said angularly disposed casings and joint fittings in spaced relation to their respective inner sides, and the internal cross-sectional area of said another casing being less than that of the angularly disposed casings and joint fittings.

5. In combination, conduits and casings receiving the same therein and therethrough, certain of said casings being angularly disposed with relation to others thereof and spaced with relation to each other, another of said casings being positioned between the outer ends of the angularly disposed casings and disposed substantially parallel to said other casings, sectional joint fittings interconnecting the relatively adjacent ends of said angularly disposed, other and another casings, the internal cross-sectional areas of said angularly disposed casings being materially greater than the external cross-sectional areas of the conduits received thereby, said last mentioned conduits being received in and through said angularly disposed casings and joint fittings in spaced relation to their respective inner sides, the internal cross-sectional area of said another casing being less than that of the angularly disposed casings and joint fittings, and plates connected to the ends of the fittings adjacent the opposite ends of said another casing having openings therein of less area than the internal cross-sectional areas of the fittings and snugly receiving therein the adjacent and opposite end portions of said another casing.

6. An expansion-contraction compensating device, comprising in combination with conduits having portions of the same arranged in substantially inverted U-shaped formation, a sectional multi-way fitting receiving portions of the conduits, in proximity to said inverted U-shaped formation, in and through certain of its ways in longitudinally opposed relation and spaced from its interior walls, the remaining and outer portions of said conduits of the inverted U-shaped formation being extended through the remaining way of the fitting in spaced relation thereto, a tubular section endwise engaged with the sectional multi-way fitting adjacent to and communicating with said remaining way therein, said tubular section receiving the outer portions of the conduits of the inverted U-shaped formation therein and longitudinally thereof in spaced relation to its interior walls, plates having openings therethrough engaged with the fitting adjacent and over said certain ways and receiving portions of the conduits therethrough and supporting the same in spaced relation to the interior walls of the fitting, and another plate engaged with said fitting over and closing the remaining way in the same beyond the outer end of said conduit inverted U-shaped formation.

EDWARD W. KAISER.

REFERENCES CITED

The following references are of record in the file of this patent:

UNITED STATES PATENTS

| Number | Name | Date |
|---|---|---|
| 240,236 | Delany | Apr. 19, 1881 |
| 266,916 | Strohm | Oct. 31, 1882 |
| 294,977 | Eberhardt | Mar. 11, 1884 |
| 394,620 | Shepler | Dec. 18, 1888 |
| 683,521 | Teuscher | Oct. 1, 1901 |
| 1,120,880 | Zwiesler | Dec. 15, 1914 |
| 1,331,988 | Griffin | Feb. 24, 1920 |
| 1,379,811 | Fyffe | May 31, 1921 |
| 1,442,404 | Haubert | Jan. 16, 1923 |
| 1,494,693 | Loi | May 20, 1924 |
| 1,495,066 | Browne | May 20, 1924 |
| 1,497,652 | Browne | June 10, 1924 |
| 1,650,234 | Plunkett | Nov. 22, 1927 |
| 2,032,445 | Smith | Mar. 3, 1936 |
| 2,209,152 | Daniels | July 23, 1940 |
| 2,297,146 | Guirl | Sept. 29, 1942 |

FOREIGN PATENTS

| Number | Country | Date |
|---|---|---|
| 10,054 | Great Britain | Apr. 25, 1910 |
| 445,576 | Great Britain | Apr. 14, 1936 |